(12) United States Patent
Anderson et al.

(10) Patent No.: US 7,966,954 B2
(45) Date of Patent: Jun. 28, 2011

(54) AIR/PRODUCT FLOW SPLITTING APPARATUS FOR USE WITH PRODUCT DISTRIBUTION SYSTEM OF AN AGRICULTURAL SEEDING MACHINE

(75) Inventors: Brian Anderson, Yorkville, IL (US); Marvin Prickel, Homer Glen, IL (US); Josh Breuer, Chicago, IL (US); Grant MacDonald, Elgin, IL (US); Josh Roszman, Shorewood, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/482,973

(22) Filed: Jun. 11, 2009

(65) Prior Publication Data

US 2010/0313800 A1 Dec. 16, 2010

(51) Int. Cl.
*A01C 7/00* (2006.01)
*A01C 9/00* (2006.01)

(52) U.S. Cl. ........................................................ 111/175

(58) Field of Classification Search ............... 111/77, 111/118–121, 127, 170, 174, 175, 177, 200, 111/903, 921, 925; 221/211, 200, 203; 239/10, 239/161

See application file for complete search history.

(56) References Cited

U.S. PATENT DOCUMENTS

| 4,082,364 | A | 4/1978 | Krambrock |
| 5,161,473 | A | 11/1992 | Landphair et al. |
| 5,265,547 | A | 11/1993 | Daws |
| 6,782,835 | B2 | 8/2004 | Lee et al. |
| 6,835,362 | B1 | 12/2004 | Eriksson |
| 7,025,010 | B2 | 4/2006 | Martin et al. |
| 7,213,525 | B2 | 5/2007 | Meyer et al. |
| 7,395,769 | B2 | 7/2008 | Jensen |
| 7,418,908 | B2 | 9/2008 | Landphair et al. |
| 2006/0086295 | A1* | 4/2006 | Jensen .......................... 111/118 |

* cited by examiner

*Primary Examiner* — Christopher J. Novosad
(74) *Attorney, Agent, or Firm* — Rebecca Henkel

(57) ABSTRACT

A splitter divides an air/product mixture flow, delivered thereto in an air-powered distribution line, between a primary and a secondary distribution channel, which may be flow-coupled to a product hopper or a hose flow-coupled to another product hopper or another splitter. The air/product mixture enters the inlet of the splitter along an angled downward flow path and exits a primary outlet, flow-coupled to the primary distribution channel, along a vertical downward flow path. Air/product flow is exhausted by a secondary outlet, which is flow-coupled to the secondary distribution channel, at an angled upward flow path. The velocity flow vector along which the air/product mixture is exhausted from the secondary outlet is at an acute angle relative to the velocity flow vector along which the air/product mixture is received by the inlet of the splitter.

12 Claims, 5 Drawing Sheets

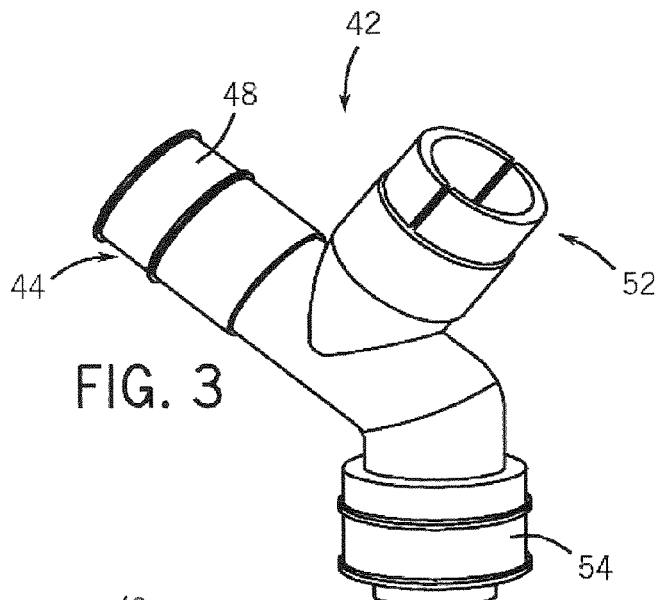
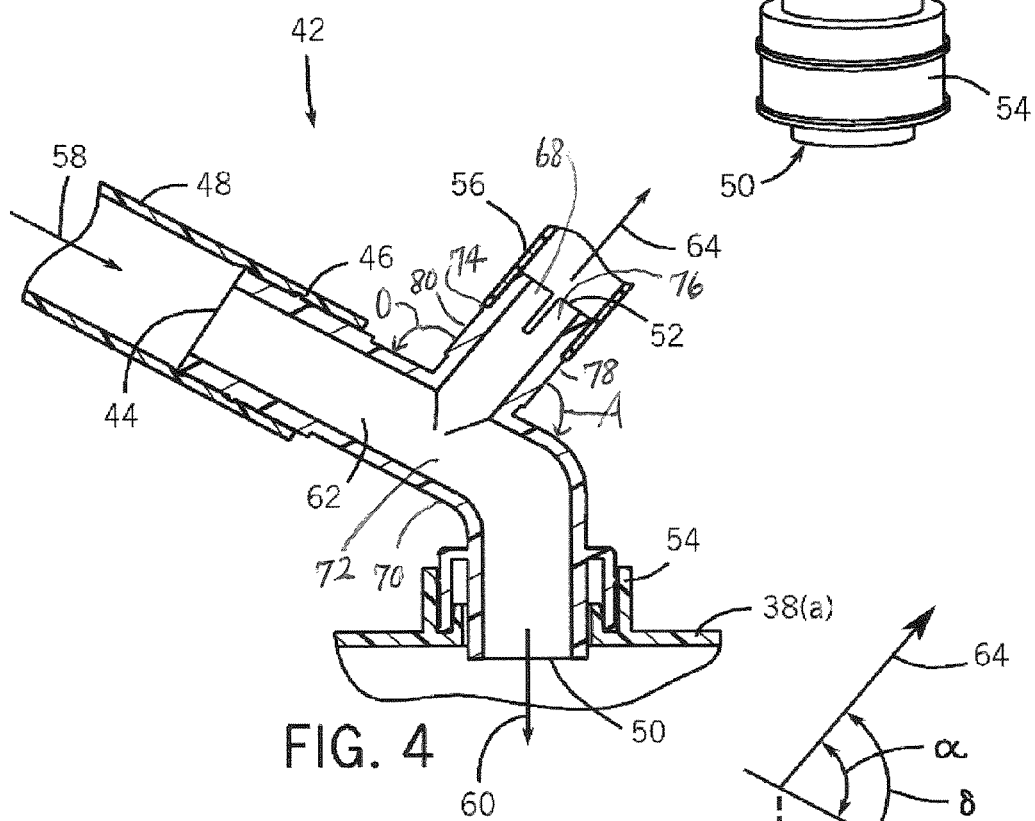
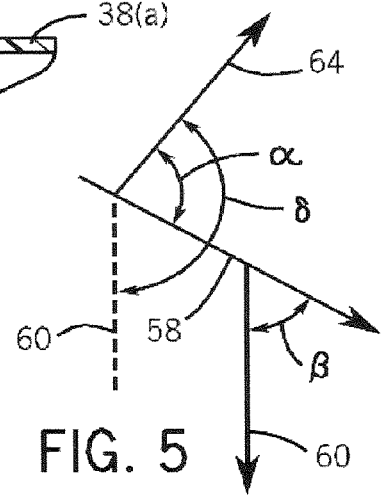

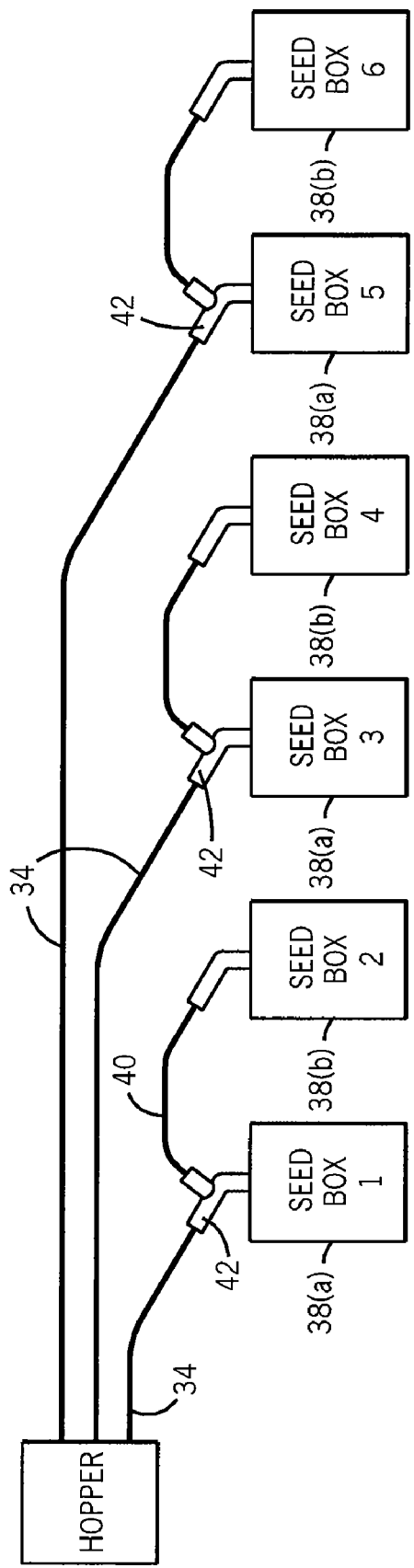
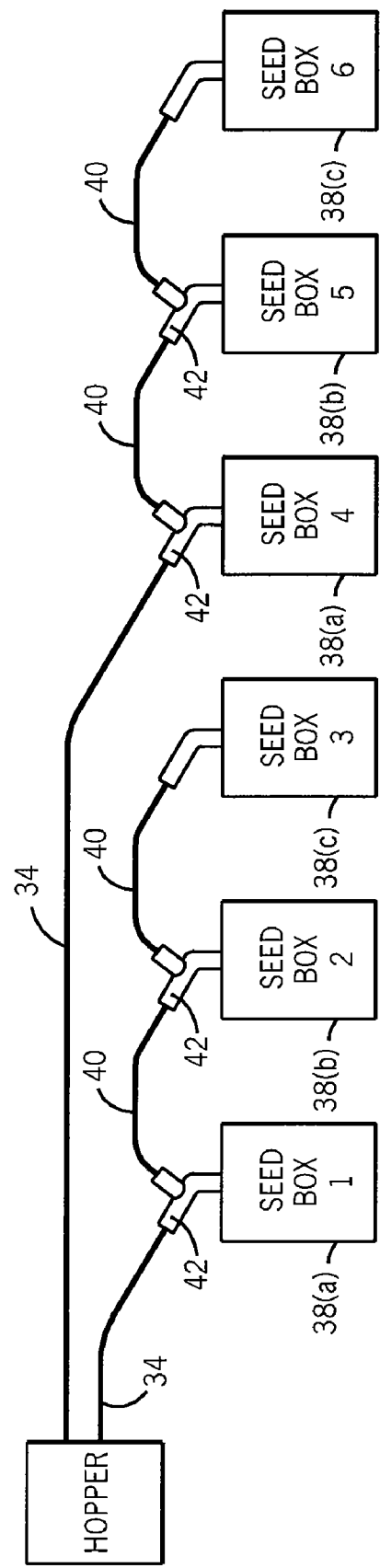

AIR/PRODUCT FLOW SPLITTING APPARATUS FOR USE WITH PRODUCT DISTRIBUTION SYSTEM OF AN AGRICULTURAL SEEDING MACHINE

BACKGROUND OF THE INVENTION

The present invention relates generally to agricultural equipment and, more particularly, to an apparatus to control the delivery of product, such as seed, from a main product storage container to multiple auxiliary storage containers.

Modern agricultural seeding machines or seeders are commonly equipped with a main seed hopper that provides seed (or other granular product) in a forced air stream to multiple auxiliary seed hoppers. Each auxiliary seed hopper may be associated with a single seed dispensing unit or with multiple seed dispensing units, generally constituting a row of seed or planting units. In this latter configuration, each seed unit may also have its own seed hopper to which seed is fed from the auxiliary seed hopper for that row of seed units. Generally, the seed is entrained in an air/seed mixture that is delivered from the main seed hopper to the auxiliary seed hoppers.

In a conventional arrangement, multiple hoses will be run from the main seed hopper to the individual auxiliary seed hoppers. Because the distance the auxiliary seed hoppers are from the main hopper is different for each of the auxiliary seed hoppers, the length of the hoses connecting the auxiliary seed hoppers to the main hopper also varies. This can create an unbalanced air distribution between hose runs of different lengths. More particularly, the shortest hose may get a disproportionate amount of air compared to the longest hose.

In addition, there is a hose extending from the main seed hopper for each row of seed units as the auxiliary seed hoppers for each row of seed units will typically have a dedicated hose connecting it to the main seed hopper. For machines have a large number of rows, this can lead to a relatively large number of hoses. This drawback is exacerbated as the number of rows of seed units increases for larger seeding machines.

One proposed solution has been to use a single hose to provide an air/seed mixture to more than one auxiliary seed hopper using a splitter or diverter. An example of such a configuration is described in U.S. Pat. No. 7,025,010, which describes a splitter having an inlet that receives an air/seed mixture, a primary outlet, and a secondary from which the air/seed mixture is dispensed. In one embodiment, the splitter is constructed such that the secondary outlet is arranged at an obtuse angle as defined by the angle between the flow velocity vector of the air/seed mixture entering the splitter at the inlet and the flow velocity vector of the air/seed mixture exiting the splitter through the secondary outlet. The patent specifically teaches that an obtuse angle of 120 degrees, and further teaches orienting the secondary outlet vertically and at the obtuse angle so that the flow must turn a sharp angle and slightly reverse itself to flow in the vertical orientation. According to the patent, this geometry helps prevent blockage within the hose.

While the splitter disclosed in U.S. Pat. No. 7,025,010 may offer some benefits over other conventional splitter designs, it is believed that further performance benefits may be attained with a splitter having a different design.

SUMMARY OF THE INVENTION

The present invention is directed to a splitter for use with a bulk fill delivery system of an agricultural seeder, which distributes seed or other granular product from a main hopper, which is typically centrally located on the agricultural seeder, to multiple auxiliary seed hoppers, with an auxiliary seed hopper associated with each row of seed dispensing units. The splitter divides an air/product mixture, e.g., air/seed mixture, from an air-powered distribution line, between two receptacles, e.g., auxiliary hoppers. The splitter has an inlet, a primary outlet, and a secondary outlet. The inlet receives the air/product mixture from the distribution line, which is typically connected to a bulk fill inductor box. The splitter is oriented such that the primary outlet will exhaust nearly all of the air/product mixture into the auxiliary hopper flow-coupled to the primary outlet. When that auxiliary hopper is (nearly) full, product will begin to backload through the primary outlet and into the splitter. When product has built up to the intersection of the primary outlet and the secondary outlet, the air/product mixture will then be exhausted by through the secondary outlet. The secondary outlet is flow-coupled to another auxiliary hopper for another row of seed units, and will begin to pass a non-negligible amount of product to the auxiliary hopper when the auxiliary hopper with the primary outlet is full.

In accordance with one aspect of the invention, the primary outlet is oriented such that the air/product mixture follows a vertical downward flow path as the air/product mixture is exhausted by the primary outlet. On the other hand, the secondary outlet is oriented such that the air/product mixture follows an angled upward flow path as the air/product mixture is exhausted by the secondary outlet. The air/product mixture is fed to the inlet of the splitter along an angled downward flow path.

In accordance with another aspect of the invention, the splitter is constructed and arranged such that the air/product mixture is exhausted by the secondary outlet along a flow path that has a velocity vector that is at an acute angle relative to the velocity vector of the flow path along which the air/product mixture flows into the inlet of the splitter.

According to a further aspect of the invention, a splitter is provided having an inlet, a primary outlet, and a secondary outlet. The primary outlet is flow-coupled to a seed box for one row of seed dispensing units and the secondary outlet is flow-coupled to the inlet of another splitter. This second splitter has a primary outlet that is flow-coupled to the seed box for another row of seed dispensing units, and has a secondary outlet that may be flow-coupled to a seed box for yet another row of seed dispensing units or to the inlet of another splitter. Preferably, the splitters are arranged such that a downstream seed box is not filled until each of its upstream seed boxes is filled.

It is therefore one object of the invention to provide a flow control device flow-coupled to a pair of distribution channels that provides a primary air/product flow to a first distribution channel and maintains that primary flow until product has built up to a point that blocks further air/product flow to the first distribution channel, and when the first distribution channel is blocked, divert the air/product flow to a second distribution channel so that a non-negligible amount of product is fed to the second distribution channel.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE FIGURES

Preferred exemplary embodiments of the invention are illustrated in the accompanying drawings in which like reference numerals represent like parts throughout.

In the drawings:

FIG. 3 is an isometric view of an air/seed splitter according to one embodiment of the invention;

FIG. 4 is a section view of the splitter shown in FIG. 3;

FIG. 5 is a schematic view of the velocity flow vectors for the splitter shown in FIGS. 3 and 4;

FIG. 6 is a schematic block diagram of one seed distribution arrangement according to one embodiment of the invention; and FIG. 7 is a schematic block diagram of another seed distribution arrangement according to another embodiment of the invention.

DETAILED DESCRIPTION OF THE INVENTION

Figure 1:
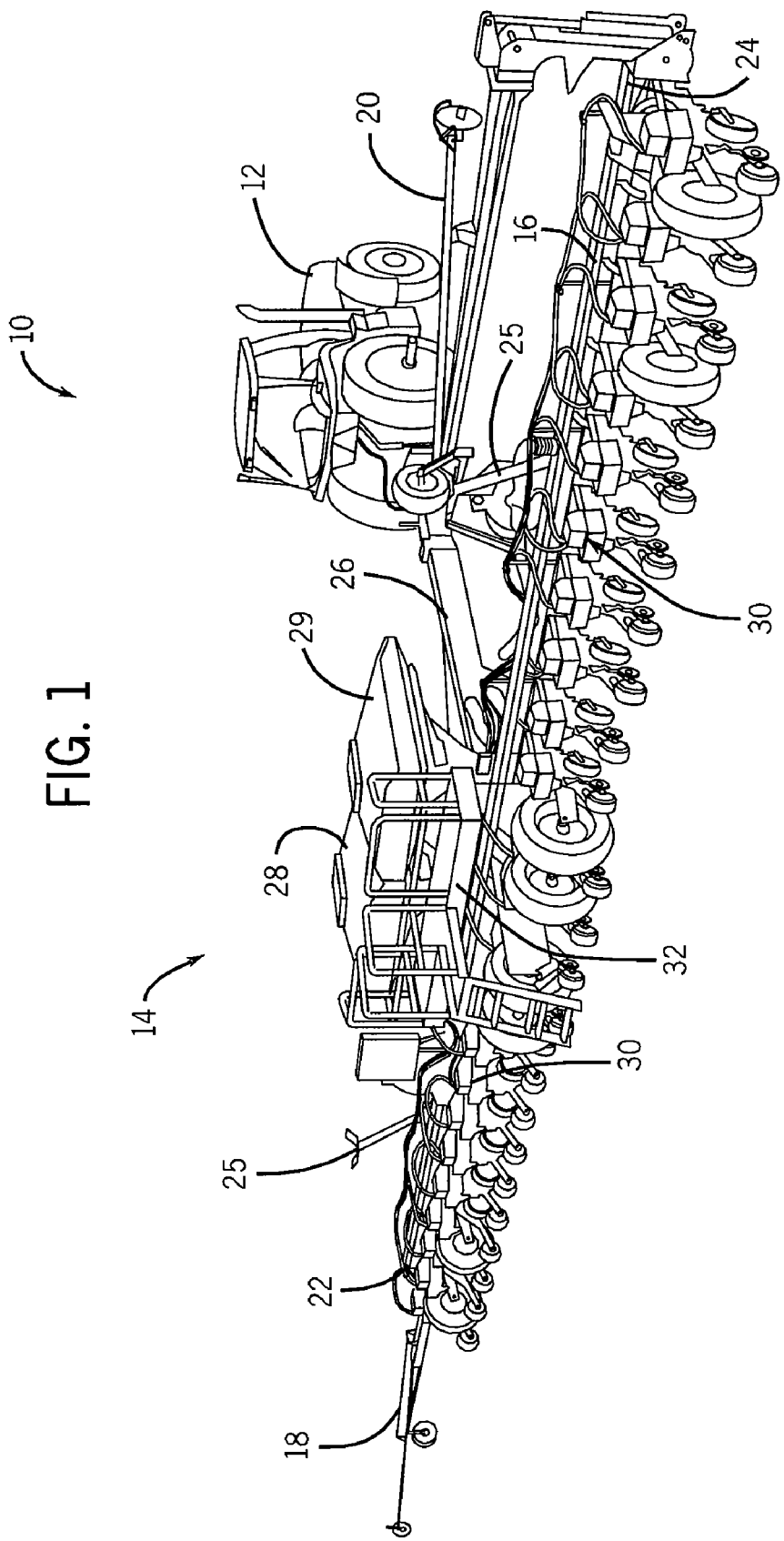
FIG. 1 is a rear isometric view of a seeder having a bulk fill subsystem that provides seed to a series of spaced row units using air/seed splitters according to one aspect of the invention and shown hitched to a tractor.

Referring now to the drawings, and more particularly to FIG. 1, there is shown an agricultural work system 10 that includes an agricultural work vehicle, such as tractor 12 that tows an agricultural implement 14, which is depicted as a multi-row front fold transport seeder. Seeder 14 can include a toolbar 16 with left and right marker assemblies 18, 20 that are attached to left and right ends 22, 24 of toolbar 16, respectively. Supports 25 can support marker assemblies 18, 20 when in a folded position.

Seeder 14 can include other elements such as drawbar 26 for connection to tractor 12, large seed hoppers 28, 29 which provide seeds to row or seed units 30, and platform and gate assembly 32 for accessing and filling large seed hoppers 28, 29. Row or planting units 30 can include a variety of elements for dispensing seed, fertilizer, pesticide, herbicide and other agricultural materials. Such elements can include, but are not limited to, a furrow opening apparatus; gage wheels; a pair of lateral spaced, or staggered, furrow opener discs, or alternatively, and without detracting or departing from the spirit and scope of the present invention, a runner opener type for providing a furrow in the ground; a pair of furrow closer discs, a seed meter, a press wheel arranged in fore-and-aft relationship relative to each other; and a agricultural chemical hopper. Additionally, seeder 14 can have planting units 30 with individual seed boxes in addition to the large seed hoppers 28, 29.

Figure 2:
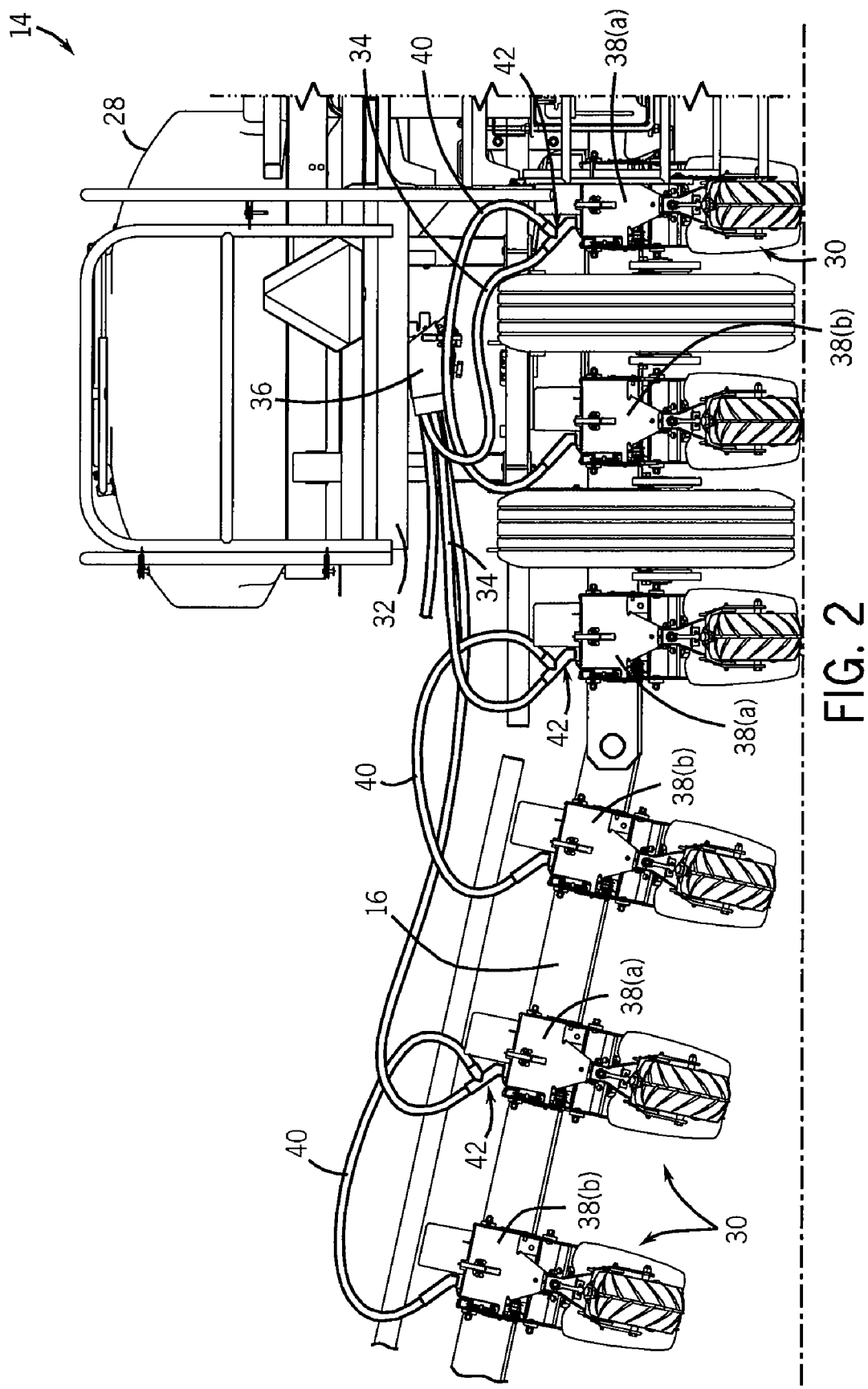
FIG. 2 is a partial rear elevation view of the seeder shown in FIG. 1.

As noted above, the seeder 14 has a pair of bulk fill hoppers 28, 29. Bulk fill hopper 28 holds seed for the seed units 30 mounted to the left wing of frame 16 and bulk fill hopper 29 holds seed for the seed units 30 mounted to the right wing of frame 16. As shown in FIG. 2, the seed units 30 are flow coupled to its bulk fill hopper by supply hoses 34. Seed is metered from the bulk fill hopper 28 to the hoses by a seed metering assembly 36, as known in the art. Each seed unit 30 has a seed box 38 and the seed is delivered from the bulk fill hopper to the individual seed boxes 38.

In contrast to a conventional seeder, and in accordance with one embodiment of the invention, supply hoses 34 from the seed metering assembly 36 are flow-coupled to alternating seed boxes 38. Jumper hoses 40 and splitters 42 are used to deliver seed to those seed boxes 38 not directly connected to a supply hose 34 flow-coupled to the seed metering assembly 36. As will be described more fully below, a seed box that is directly flow-coupled to the seed metering assembly 36 is filled in a first fill stage and thus will be designated as seed box 38(a). A seed box that is indirectly flow-coupled to the seed metering assembly 36 via a jumper hose 40 and splitter 42 is filled in a second fill stage and thus will be designated as seed box 38(b). In the illustrated embodiment, there are equal number first fill stage seed boxes 38(a) and second fill stage seed boxes 38(b). In this regard, for each pair of seed boxes 38, one is a first fill stage seed box and the other one is a second fill stage seed box. It is understood however that multiple seed boxes may be daisy-chained together such that one seed box 38(a) is directly coupled to the seed metering assembly 36 and a series of jumper hoses 40 and splitters 42 are successive used to flow-couple the downstream seed boxes to the seed metering assembly.

With additional reference to FIGS. 3-4, splitter 42 has a splitter inlet 44 adapted to engage a quick-connect coupler 46 of a feeder hose 48. It will be appreciated that the feeder hose 48 may be supply hose 34 or jumper hose 40 depending upon the seed distribution arrangement being used. In the arrangement shown in FIG. 2, the splitter inlet 44 is flow-coupled to a supply hose 34. The splitter 42 also has a primary splitter outlet 50 and a secondary splitter outlet 52. The primary splitter outlet 50, which is at lower position than the secondary splitter outlet 52, is adapted to engage a quick-connect coupler 54 of a seed box 38(a) and the secondary splitter outlet 52 is adapted to engage a quick-connect coupler 56 of a jumper hose 40. While the preferred embodiment is described and shown as having two splitter outlets, it is understood that the splitter 42 may have more than two outlets.

The splitter 42 is oriented such that the splitter inlet 44 receives an air/seed mixture along a downwardly and angled flow path, as represented by the velocity flow vector 58. The air/seed mixture passes from the splitter inlet 44 and is forced under air and gravity to the primary splitter outlet 50, which passes the air/seed mixture along a vertical downward flow path, generally represented by the velocity flow vector 60. The secondary splitter outlet 52 extends from the splitter body 62 at angle such that the air/seed mixture generally bypasses the secondary splitter outlet 52. That is, the secondary splitter outlet 52 is configured to pass air and seed along an angled and upward direction, generally represented by velocity flow vector 64. The inlet or splitter body 62 includes an outer perimeter 70 and an inner perimeter 72 formed by an opening therethrough. A secondary splitter body 68 also includes an outer perimeter 74 and an inner perimeter 76 formed by an opening therethrough. The secondary splitter body 68, as discussed in greater detail below, has a first portion 78 of its outer perimeter 74 which is positioned nearest or next to the seedbox 38(a). The secondary splitter body 68 also has a second portion 80 of its outer perimeter 74 which is positioned opposite the first portion 76. A junction between the first portion 78 and the outer perimeter 70 of the splitter body 62 forms an acute angle, as shown in FIG. 4 by arrow A. A junction on the opposite side, namely, between the second portion 80 and the outer perimeter 70 of the splitter body 62 forms an obtuse angle, shown in FIG. 4 by arrow O.

Figure 4A:
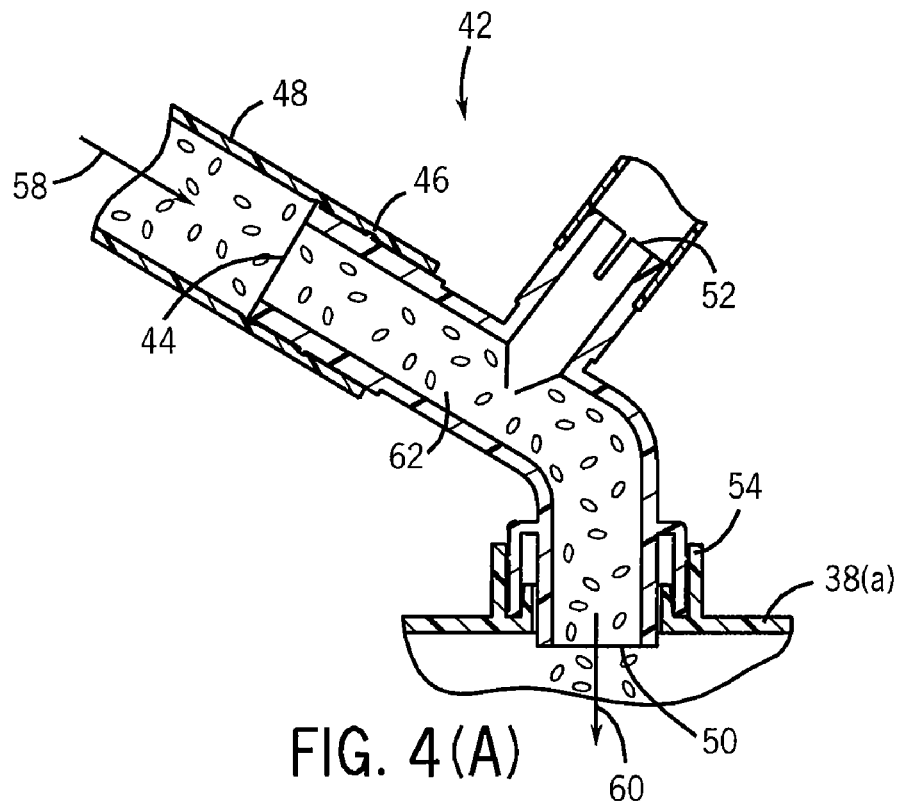
FIG. 4A is a section view of the splitter shown in FIG. 3 shown passing an air/seed mixture from a splitter inlet to a primary splitter outlet.
Figure 4B:
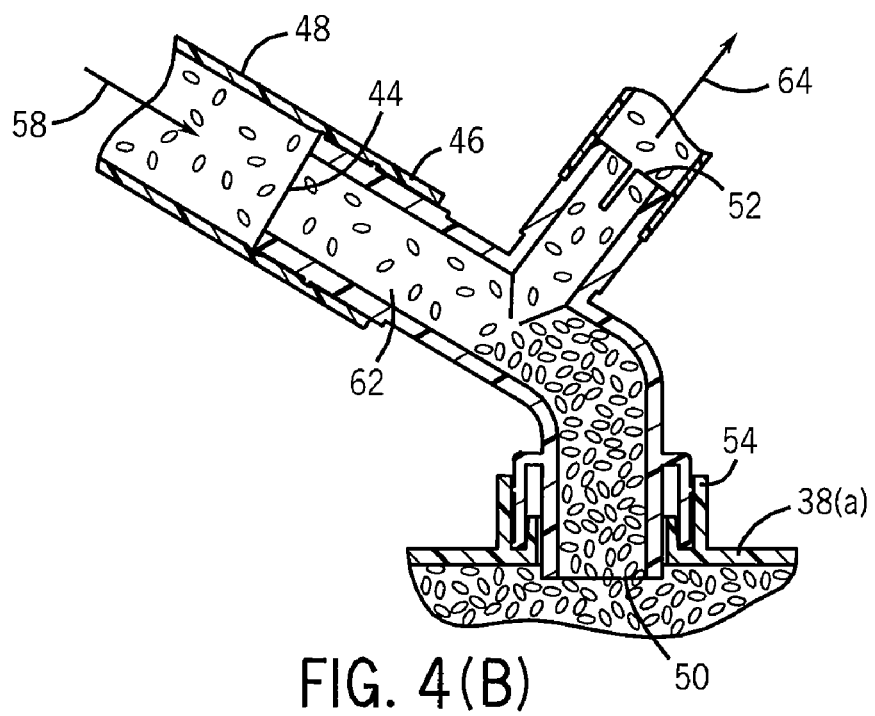
FIG. 4B is a section view of the splitter shown in FIG. 3 shown passing an air/seed mixture from the splitter inlet to a secondary splitter outlet.

Referring now to FIG. 4A, air/seed mixture is fed to the splitter inlet 44 along the splitter body 62 and passed through primary splitter outlet 50 to load seed into the seed box 38(a) during a primary fill stage. The air/seed mixture will continue to be fed from the inlet 44 to the primary splitter outlet 50 until the seed box 38(a) fills and seed begin to backfill up through the primary splitter outlet 50. When seed has backed up past the primary outlet 50 into the splitter body 62 to a level generally adjacent the secondary splitter outlet 52, as shown in FIG. 4B, seed, entrained in air, that is passed through the splitter inlet 44 will be directed toward the secondary splitter outlet 52 and passed through the secondary splitter outlet 56 along the secondary velocity flow vector 64. In this regard, the backed up seed closes off the primary splitter outlet 50 to force any incoming air/seed mixture to the secondary splitter outlet 52 during a secondary fill stage. It will be appreciated that negligible quantities of seed may be passed through the secondary splitter outlet 52 during the primary fill stage, but the angled upward orientation of the secondary splitter outlet 52 prevents large amounts of seed from being presented to the secondary splitter outlet 52 until seed has closed off the primary splitter outlet 50. It will also be appreciated that the use of the terms "primary" and "secondary" connotes only the fill order and does not suggest any difference in function or importance.

Referring now to FIG. 5, the velocity flow vectors representative of the flow of an air/seed mixture is shown. In one preferred embodiment, the angle α formed between the inlet velocity flow vector 58 and the secondary outlet velocity flow vector 64 is a non-obtuse angle, and is preferably an acute angle, such as 85 degrees. The angle β formed between the inlet velocity flow vector 58 and the primary outlet velocity flow vector 60 is an acute angle, and is preferably 60 degrees. The angle γ formed between primary outlet velocity flow vector 60 and the secondary outlet velocity flow vector 64 is an obtuse angle, and is preferably 145 degrees.

Referring now to FIG. 6, as noted above, in one embodiment, a jumper hose 40 and a splitter 42 is used to connect a single second fill stage seed box 38(b) to a supply hose 34 that supplies seed to a first fill stage seed box 38(a). In another embodiment, as illustrated in FIG. 7 for example, multiple jumper hoses 40 and multiple splitters 42 may be used "daisy-chain" multiple seed boxes. In the arrangement illustrated in FIG. 7, the arrangement of seed boxes results in the afore-described first and second fill stage seed boxes 38(a) and 38(b), respectively, but also includes third fill stage seed boxes 38(c). A third fill stage second seed box 38(c) is filled after its associated second fill stage seed box 38(b) is filled. In this regard, a supply hose 34 is flow-coupled to the inlet 44 of a splitter 42, a seed box 38(a) is flow-coupled to the primary splitter outlet 50, and a jumper hose 40 is flow-coupled to the secondary splitter outlet 52. Instead of the other end of the jumper hose 40 being flow-coupled to a seed box 38(b), the jumper hose 40 is flow-coupled to the splitter inlet 44 of another splitter 42. The primary splitter outlet 50 is flow-coupled to a seed box 38(b) and the jumper hose 40 is flow-coupled at one end to the secondary splitter outlet 52 and an opposite end to a seed box 38(c). The configuration of the splitter 42 interconnected between the second fill stage seed box 38(b) and the third fill stage seed box 38(c) is similar in function to the splitter interconnected between the second fill stage seed box 38(b) and the first fill stage seed box 38(a). As such, the third fill stage seed box 38(c) is not filled with seed until after the second fill stage seed box 38(b) has been filled. Thus, in this embodiment, a single supply hose 34 may be used to deliver seed to three (3) seed boxes. It is understood that additional jumper hoses and splitters may be used to link more than three (3) seed boxes to one another to further reduce the number of hoses flow-coupled directly to the seed metering assembly 36.

The invention has been described with respect to delivering seed to a series of seed units. It is understood however that the invention may also be used to deliver other particulate matter, such as granular herbicide, granular fertilizer, or other granular chemicals to a series of dispensing units.

Many changes and modifications could be made to the invention without departing from the spirit thereof. The scope of these changes will become apparent from the appended claims.

We claim:

1. A flow control apparatus for use with a product metering system of an agricultural implement, comprising:
    an inlet including an outer perimeter and having an inner perimeter formed by an opening extending therethrough, the inlet configured to receive and pneumatically move an air/product mixture therethrough along a first velocity vector;
    a primary outlet coupled to the inlet, the primary outlet formed to receive and hold a product pneumatically moved as air/product mixture through the inlet along the first velocity vector and into the primary outlet; and
    a secondary outlet including an outer perimeter and having an inner perimeter formed by an opening extending therethrough, the secondary outlet coupled to a portion of the inlet at a junction thereof and extending in a non-vertical orientation therefrom, the opening configured to be in pneumatic communication with the opening formed through the inlet, the junction of the inlet and secondary outlet configured such that a first portion of the outer perimeter of the secondary outlet forms an acute angle relative to its junction with the outer perimeter of the inlet, and a second portion of the outer perimeter of the secondary outlet opposite the first portion forms an obtuse angle relative to its junction with the outer perimeter of the inlet, the secondary outlet configured to receive and substantially pneumatically move an air/product mixture therethrough along a second velocity vector when product fills the primary outlet and inlet up to the junction of the inlet and the secondary outlet such that the air/product mixture is moved upward through the secondary outlet along the second velocity vector.

2. The flow control apparatus of claim 1 wherein the secondary outlet is upstream of the primary outlet, and wherein the inlet has a vertical section which is positioned adjacent the primary outlet.

3. The flow control apparatus of claim 2 wherein the air/product mixture is moved from the first vector of the inlet to the second vector of the secondary outlet through the obtuse angle formed at one side of the junction of the inlet and secondary outlet.

4. The flow control apparatus of claim 3 wherein the air/product mixture will flow through at least one other obtuse angle before being deposited in a third outlet.

5. The flow control apparatus of claim 1 wherein the apparatus does not include a valve at or near the junction of the inlet and secondary outlet.

6. The flow control apparatus of claim 1 wherein the secondary outlet has a non-arcuate configuration.

7. The flow control apparatus of claim 6, wherein a substantial portion of the inlet includes a substantially non-arcuate configuration.

8. A flow control apparatus for use with a product metering system of an agricultural implement, comprising:

an inlet which includes an outer perimeter and having an opening formed therethrough and configured to receive and pneumatically move an air/product mixture therethrough along a first velocity vector;

a primary outlet coupled to the first open end of the inlet, the primary outlet formed to receive and hold a product pneumatically moved as air/product mixture through the inlet along the first velocity vector and into the primary outlet; and a secondary outlet which includes an outer perimeter and having an opening formed therethrough, the secondary outlet having a non-arcuate configuration, the secondary outlet coupled to a portion of the inlet at a junction therebetween, the opening configured to be in pneumatic communication with the opening formed through the inlet, the junction of the inlet and secondary outlet configured such that a first portion of the outer perimeter of the secondary outlet forms an acute angle relative to its junction with the outer perimeter of the inlet, and a second portion of the outer perimeter of the secondary outlet opposite the first portion forms an obtuse angle relative to its junction with the outer perimeter of the inlet, the secondary outlet configured to receive and substantially pneumatically move an air/product mixture therethrough along a second velocity vector when product fills the primary outlet and inlet up to the junction of the inlet and the secondary outlet such that the air/product mixture is moved upward through the secondary outlet along the second velocity vector, and wherein the air/product mixture is moved from the first velocity vector of the inlet to the second velocity vector of the secondary outlet through the obtuse angle formed at the junction of the inlet and secondary outlet.

9. The flow control apparatus of claim 8 wherein the secondary outlet extends from its junction with the inlet in a non-vertical orientation, and wherein the secondary outlet is upstream from the primary outlet.

10. The flow control apparatus of claim 9 wherein the inlet has a vertical section which is positioned adjacent the primary outlet.

11. The flow control apparatus of claim 8 wherein the air/product mixture will flow through at least one other obtuse angle before being deposited in a third outlet.

12. The flow control apparatus of claim 8, wherein a substantial portion of the inlet includes a substantially non-arcuate configuration.

* * * * *